United States Patent Office 2,823,544
Patented Feb. 18, 1958

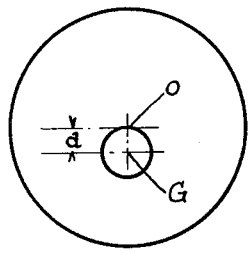
*Fig. 2.*
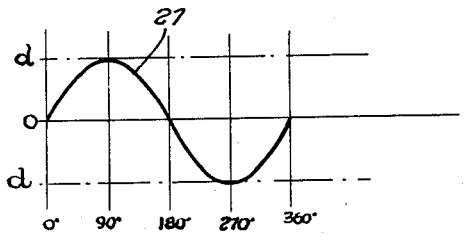
*Fig. 3.*
*Fig. 4.*
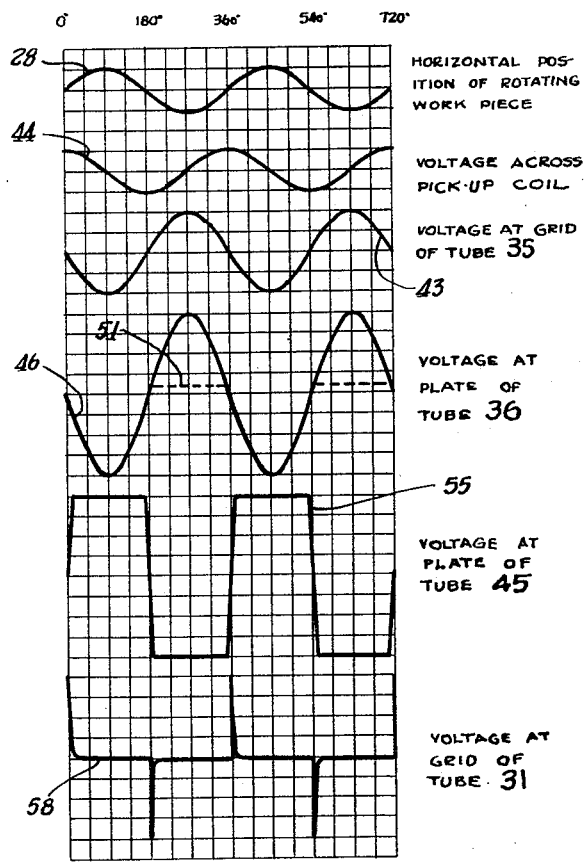
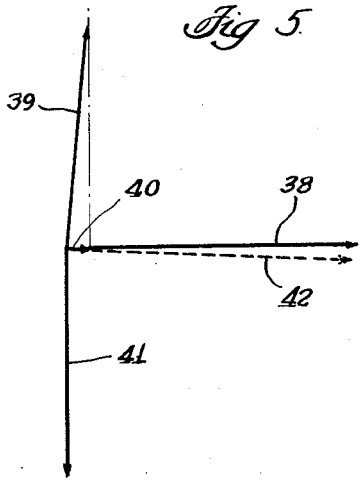
*Fig. 5.*
JOHN G. McCOY
INVENTOR.
BY
atty.

2,823,544

ROTOR UNBALANCE INDICATING DEVICE WITH STROBOSCOPE PHASING

John G. McCoy, Chicago, Ill., assignor to Balance Engineering Co., Chicago, Ill., a corporation of Illinois Application February 18, 1954, Serial No. 411,059

1 Claim. (Cl. 73—466)

The present invention relates to dynamic balancing machines and concerns itself more particularly with electrical control systems for stroboscopic lamps which are used for making certain visual observations in conjunction with such machines.

Test subjects are usually supported for horizontal-axis rotation on journal structures which are free to vibrate horizontally in a direction transverse to the rotary axis. It is desirable to be able to make observations upon the test subjects during their rotation from a vantage other than the plane in which the journal structures vibrate. Such observations are made by flashing a stroboscopic lamp from impulses stimulated by the horizontal vibrations. In order that the stroboscopic flash instant be made to coincide with the desired vantage it is proposed to introduce an orientation factor into the control circuit which will with constancy displace in an angular sense the cyclic occurrence of each firing impulse.

Otherwise the occurrence of the flash corresponds with the unbalance condition and requires that the observation be made at the vibratory plane.

It is herewith proposed to introduce a constant, angular displacement inherent in the electrical circuit of the stroboscopic and sensory apparatus which will precisely displace the triggering instant in respect to its vibrational stimuli so that, although the vibrational impulses occur at a time when the work subject is disposed with its unbalance condition lying in a horizontal plane, nevertheless, the visual flash and observation instant will be made to occur when the unbalanced condition is passing a vertical point which is manifestly more convenient for inspection as well as subsequently for the purpose of correction.

A principal object of the present invention therefore is one of providing an apparatus for use in conjunction with dynamic balancing machines which will incorporate a constant factor angular correction in respect to each rotary cycle of a test subject so that the stroboscopic illumination instant is precisely displaced in an angular sense from its impulse generating instant.

Another object of the present invention is to devise a flashing circuit for stroboscopic lamps modified by a constant angular displacement so that the reference point in a test subject circumference may be brought into a convenient position for observation.

With the foregoing and other objects in view, the invention will now be described more detailedly by referring to the illustrations in the accompanying drawings in which similar reference numerals designate corresponding parts throughout. In the accompanying illustrations:

Fig. 2 is a diagram of a rotor subject on an enlarged scale upon which the axial and inertia centers have been portrayed figuratively;

Fig. 3 is a curve chart projected from the subject shown in Fig. 2;

Fig. 4 is a diagrammatic chart featuring the relationship in phase between various components of the system, and Fig. 5 is a phasor diagram of various electrical characteristics pertaining to the voltage-current displacement inherent in the tuning circuit.

Figure 1:
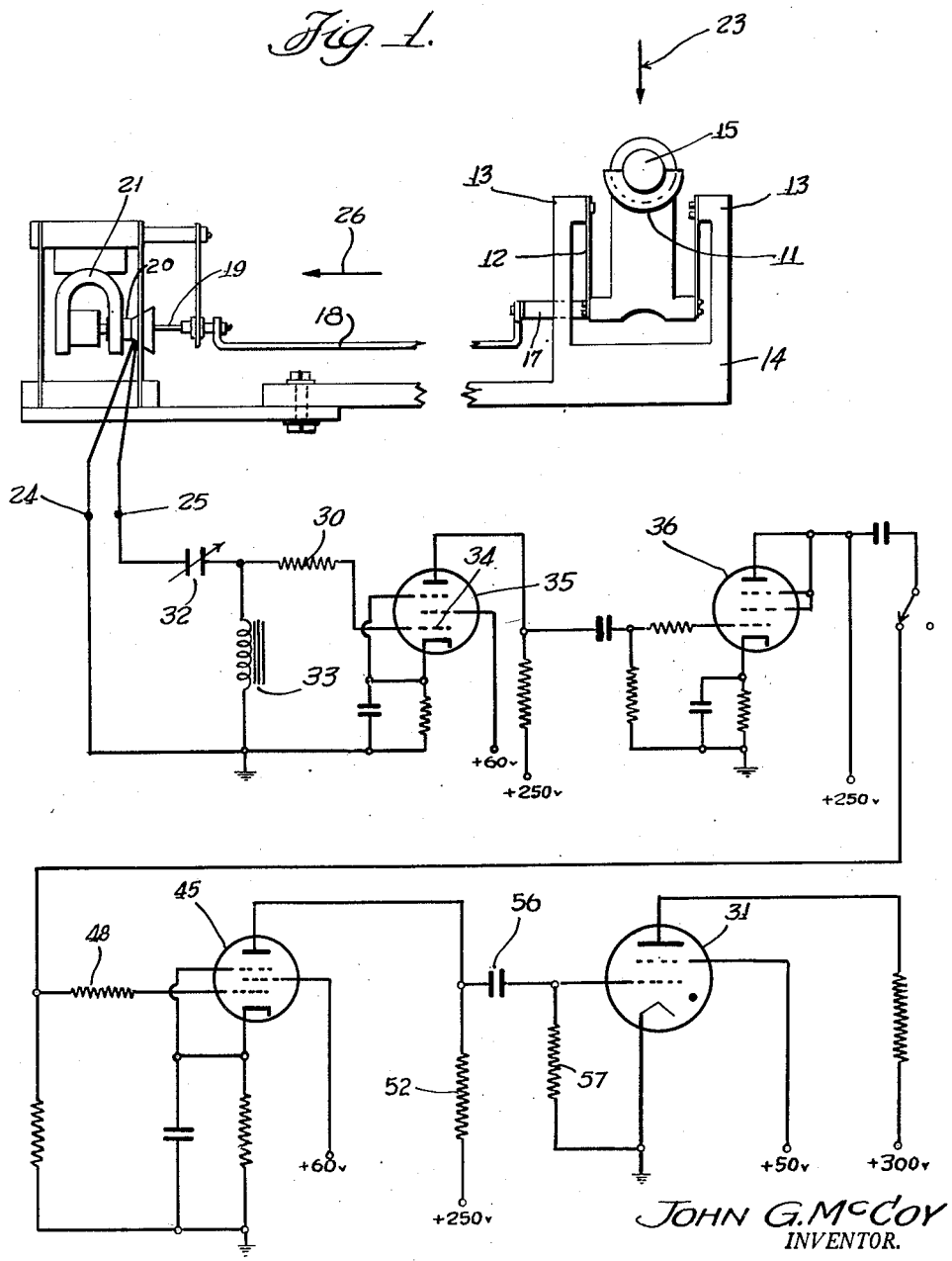
Fig. 1 is a diagrammatic circuit illustration which embodies various features of the invention.

As is exemplified in co-pending application Ser. No. 354,072, filed May 11, 1953, rotary piece parts subjected to test for dynamic or moment unbalance are customarily supported on floating pillow blocks such as designated 11 in Fig. 1. The latter members comprise essentially half bearings predeterminedly constructed to accommodate the cylindrical journal surfaces of the work pieces and suspended as by means of flat steel leaf-spring elements 12 from a pair of upstanding posts 13 which may be attached to or be integral with an adjustable support member 14.

In accordance with the described arrangement the pillow block elements 11 are relatively free to respond in a horizontal direction as viewed in Fig. 1 to the thrusts which are imparted to them on account of unbalanced vibrations generated by the rotating work piece 15. Moreover, the suspensation is so designed that the horizontal vibrations are substantially parallel throughout the pillow block elements 11, wherefore they are transmitted in full replica through an arm 17 secured at the lower end of the pillow block cradle elements 11 and a link 18 to a stem 19 which carries the generating coil 20 that cuts the magnetic lines of a permanent magnet 21. This electrical association of elements or any other arrangement which may perform this function instead is termed a pick-up.

It is to be understood that although the existence of mass eccentricities resulting in dynamic unbalance tends to exert itself in all directions circumferentially, the physical characteristics of the supporting pillow blocks 11 and their suspensation restrict this manifestation to a horizontal reciprocal vibration in the direction of arrow 26, which is further assured by maintaining the test rotational speed below the resonant frequency of the subject under test. Also, it will be realized that the generation of an alternating current wave pattern will exhibit current reversal lobes in conformity periodically with the aforedescribed horizontal vibrations.

Where a stroboscopic lamp is employed for illumination of the rotating piece part 15, stimulated by the unbalanced vibrations, the occurrence of its cyclic flashes will coincide with the cyclic intervals during which the unbalanced conditions are passing the horizontal plane of the rotary orbit. In order to make the out-of-balance location on the work piece visible to the operator, so as to apprise him of the place where stock is to be added or removed, the stroboscopic lamp requires to be disposed so that it will illuminate the part which produces the vibratory thrusts at the horizontal plane. Since this is not convenient for viewing, this invention proposes to introduce a fixed characteristic phase displacement into the stroboscopic lamp firing stimuli so that the occurrence of the illumination flash will coincide with a more convenient, viz., vertical, vantage point as designated, for example, by the arrow 23 in Fig. 1.

This feature of angular deviation or correction is accomplished in accordance with the instant invention by connecting the pick-up coil terminals 24 and 25 with a series resistant tuning circuit which has been illustrated in a simplified diagram Fig. 1. Voltage is induced in the pick-up coil when it moves through the field of the permanent magnet 21 corresponding to the imparted vibrations of the work piece 15 and the polarity of the induced voltage reversals accords with the reversals and direction of motion undergone by the coil.

Fig. 2 is a diagrammatic illustration viewing a workpiece rotor from the left end as it is supported in the blocks 11 of a balancing machine. The pick-up apparatus together with the cabinet which contains the control circuit elements is located at the left of the workpiece when viewed in Figs. 1 and 2. It may be assumed that the pick-up voltage is positive when motion is in accordance with the arrow 26, and negative when motion is in opposite direction.

In Fig. 2, O represents the geometric axis and G the gravitational or inertia axis, the distance between them being exaggerated for emphasis and clarity. During rotation the part will attempt to revolve in an unrestrained or free space about its inertia axis G. Center O will therefore describe a circle about G having a radius $d$. Projected into a sine curve the path of O will appear as line 27 in Fig. 3 or as line 28 in Fig. 4. When held in the pillow blocks 11 this movement is restrained except in the horizontal plane.

In reference to Fig. 3, the coil may be assumed to move into the magnet in the direction of arrow 26, Fig. 1 from point minus 90 degrees to point plus 90 degrees, whereas from plus 90 degrees to point plus 270 degrees the coil moves in an opposite direction, and in this case the voltage is assumed to be negative. Precisely at points plus 90 degrees and plus 270 degrees the coil is momentarily stationary and therefore the voltage is zero. This is portrayed by the voltage curve 44 of chart Fig. 4. Pulsations are amplified so that even minor lobes such as would be generated by marginal conditions of unbalance will produce adequate voltages to trigger the strobotron tubes which are preferably gas-filled cold cathode devices capable of rapid pulsations indicated 31 in Fig. 1.

The lead terminals 24 and 25 from the pickup coil are connected across a series resonant circuit which includes a tuning condenser 32 and an iron core tuning choke 33.

The voltage across the tuning choke 33 is applied to the grid 34 of a triple-grid amplifier pentode 35.

It is to be understood, of course, that in accordance with conventional balancing machine equipment, dual pickups are provided, one for each of the work piece supporting pillow blocks, and that a network circuit together with appropriate switching devices are employed for the purpose of reversing the polarity of each of the pickup coils as well as for the purpose of switching between the right-end pickup coil and the left-end one.

In Fig. 5 there is illustrated by vectors the phase relationship which obtains in the tuning circuit by utilizing the phenomenon of voltage lead over current.

All vectors shown in Fig. 5 rotate about their common center counterclockwise at the same frequency. The diagram represents the position of various current and voltage factors at one instant of time. Thus, vector 39, which represents the voltage across the tuning choke 33, is shown to lead vector 38, which represents the current in series circuit which contains pickup coil 20, condenser 32 and choke coil 33, by something under 90°. If the choke 33 were a pure inductance, its voltage vector 39 would lead its current vector 38 by exactly 90°, but since chokes always possess some quality of resistance, the lead is correspondingly smaller.

Vector 39 can be resolved into two components, one which leads current vector 38 by 90°, and another which is in phase with vector 38.

Vector 41 represents the voltage across condenser 32 which trails current vector 38 by 90°. At resonance the voltage across condenser 32 equals the voltage vertical component of vector 39 which is 90° ahead of current and the two cancel out leaving only the horizontal component which is the voltage of the pick-up 20 represented by arrow 40, in phase with the current. Consequently the voltage which is applied to the grid 34 of tube 35, represented by vector 39 is several times as large as the pick-up voltage 40 expressed by the quality factor Q of the tuning choke 33. At the rotating speed of 1200 R. P. M. the Q of choke 33 is about 10.

If preferred, voltage 39 may be made to lead the pick-up voltage 40 by exactly 90 degrees through the use of a tuning capacitance which differs sightly from the resonant value. This correction increases the capacitive reactance and tends to make the magnitude of voltage 41 slightly greater than that across the inductance 39. Now, the voltage across pickup terminals 24 and 25 which is the sum of vectors 39 and 41, may be shown along the line of arrow 42. Vector 40 can thus be made to lag vector 38 by a small angle and thereat be substantially 90° behind vector 39. As a consequence, the amplification factor in the tuning circuit is thereby slightly reduced, but not enough to effect seriously the utility factor of the amplifier system. In Fig. 4 the voltage at the grid of the amplifier tube 35 is represented by the curve 43 which, when compared with the curve 44, representing the pickup voltage, portrays the substantially 90 degree lead which constitutes a stable and effective phase displacement for correlating the stroboscopic flash instant with that of its cyclic occurrence corresponding to optimum advantage.

The parameters of the amplifier tube 35 are designed so as to produce a gain of about 100, the second triode indicated 36 is designed to produce a gain of about 14, so that the signal produced at the plate of the second tube 36, for even very small pulsations reflecting minor conditions of unbalance, are able to reach a peak minimum of 50 volts.

Due to the inherent characteristics of the tube arrangement, the signaling phase is reversed in each of the first two tubes 35 and 36 so that, as a consequence, the condition of the signal at the grid of the third tube 45 is in phase with that at the grid of the first tube 35. This is also indicated by the plate voltage curve 46 of Fig. 4 when compared with that of curve 43 in the same curve chart. No attempt is made to show amplitudes of the several curves of chart Fig. 4 to scale.

There is a 4.7 megohm resistor 48 in series with the grid of the third tube 45 so that when the input voltage to this tube exceeds 0.5 volt, the grid thereof will draw current. However, the exceedingly high value of the aforedescribed series resistor 48, sometimes termed a grid stopper, limits current to a very low value. This current causes a voltage drop across the resistance such that the grid end thereof is negative with respect to its opposite end. This causes the grid voltage to remain almost exactly at zero with respect to the cathode during the time when the positive loop of the circuit exceeds 0.5 volt. This condition is portrayed by the dotted lines 51 in curve 46, Fig. 4.

When the grid voltage of tube 45 is more than about five volts negative with respect to its cathode, the plate current is cut off or reduced to zero. This occurs during most of the negative loop of the input wave form. As a consequence, the plate voltage is then equal to the supply voltage. When the grid voltage is at zero with respect to cathode, then the plate current is comparatively high. This causes a voltage drop across the plate load resistor 52 which reduces the plate voltage to about plus 20 volts. From this it follows that the plate voltage is constant at about 250 volts (supply voltage) during most of the negative input half-cycle, and constant at about 20 volts during most of the positive input half-cycle. The voltage at the plate of tube 45 may therefore be portrayed symbolically by the curve 55 in chart Fig. 4.

Tube 31 is a neon-filled cold cathode strobotron tube of the rapid pulsation type which glows brilliant red when plate current is permitted to flow therethrough. When connected after the manner shown in Fig. 1, plate current may flow only when the voltage at the first grid thereof is at least ten volts positive. The 0.0005 mf. condenser 56 together with the resistor 57 convert the square wave signal which emanates from tube 45 and portrayed 55 in Fig. 4, into an instantaneous pulsation signal as portrayed by the curve 58 with the actual width of the pulsation impulses much shorter than they may be permitted to show in scale by means of this illustration. The positive ones of these pulsations fire the strobotron 31 causing illumination of the workpiece to occur when curve 28 crosses the horizontal axis going positive or at a time when the workpiece is disposed with its unbalance resolution in the vertical plane.

While the present invention has been described in contemplation of a specific embodiment, it should be understood that changes and varations are susceptible of being made without departure from the essential scope thereof. For latitude therefore, reference is made to the claim following this disclosure.

The invention claimed is:

Apparatus for stroboscopically illuminating the location of unbalance in a rotating body on the surface thereof at a point in space substantially 90° circumferentially from an axial plane of occurrence in which unbalance-caused vibrations are sensed which comprises, a pick-up unit including a signal wave generating coil, means for supporting the rotating subject and for reciprocating said coil in an axial plane in accordance with the unbalance vibrations thus produced, a field magnet disposed to have its flux path cut by the coil winding, a series resonant first stage circuit which includes said coil winding and a tuning condenser in series with a tuning choke whereby to effect a current-voltage lag phenomenon, a grid controlled amplifier tube with its grid element connected across said tuning choke whereby to displace the primary tube emission instant by approximately 90°, the said current-voltage lag factor, and to thereby reproduce its amplified output signal 180° out-of-phase with the grid voltage, second and third stage amplification tubes and circuits following said first stage circuit for steepening by amplification the positive and negative wave lobe characteristics to thereby approximate straight line side components thereof and by alternate reversal to effect a third stage plate voltage output in phase with the first stage output, and a stroboscope flash tube having its firing grid triggered by the said third stage plate voltage output signal during the positive lobe straight side rise and directed to illuminate the rotating body at a point in its rotation 90° from said axial plane and corresponding to said 90° current-voltage lag displacement.

References Cited in the file of this patent

UNITED STATES PATENTS

| | | |
|---|---|---|
| 2,140,769 | Schienemann | Dec. 20, 1938 |
| 2,383,405 | Merrill et al. | Aug. 21, 1945 |
| 2,383,588 | Bousky | Aug. 28, 1945 |
| 2,521,141 | Allen | Sept. 5, 1950 |

FOREIGN PATENTS

| | | |
|---|---|---|
| 457,021 | Great Britain | Nov. 19, 1936 |